No. 791,904. PATENTED JUNE 6, 1905.
A. HESEKIEL.
PIGMENTED PAPER.
APPLICATION FILED JAN. 24, 1905.

Witnesses
Inventor
Adolf Hesekiel

No. 791,904. Patented June 6, 1905.

UNITED STATES PATENT OFFICE.

ADOLF HESEKIEL, OF BERLIN, GERMANY.

PIGMENTED PAPER.

SPECIFICATION forming part of Letters Patent No. 791,904, dated June 6, 1905.

Application filed January 24, 1905. Serial No. 242,558.

*To all whom it may concern:*

Be it known that I, ADOLF HESEKIEL, a citizen of Germany, residing at Berlin, Germany, have invented new and useful Improvements in Pigmented Paper, of which the following is a specification.

The subject of my invention is an improvement in the method of preparing pigmented papers presenting a plurality of superposed films of divers colors for polychrome positives, especially for autotype and gum printing.

The object of the invention is to render the picture suitable for double transfer without their exhibiting after the second transfer colors essentially other than those after the simple transfer. This object is attained by graduating the successive films of color according to their covering power or "body"—that is to say, according to their transparency. The various superposed colored films in the printing-paper must increase in strength from above toward the paper base or backing in such manner that after the simple transfer each top film covers the lower ones, while after the second transfer the upper films must, something in the manner of a glaze on account of their transparency, permit of the lowermost film playing its part—that is, asserting itself.

The invention is illustrated in the accompanying drawings, in which—

Figure 1:
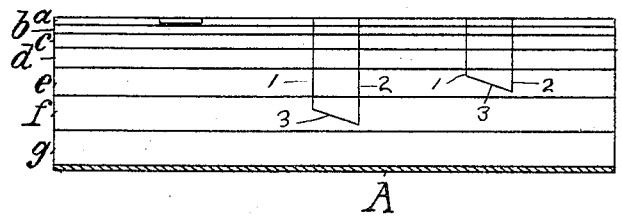
Figure 2:
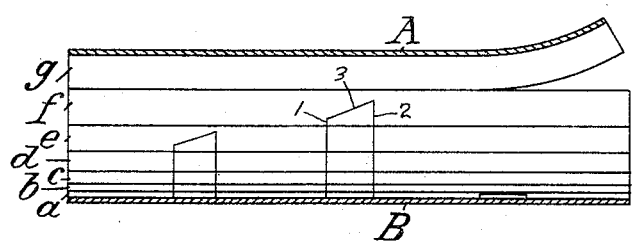
Figure 3:
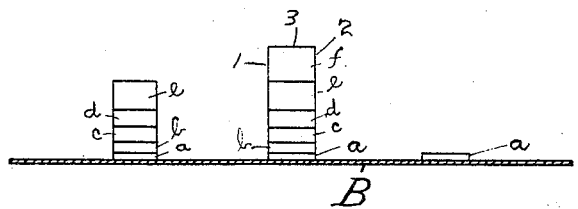
Figure 4:
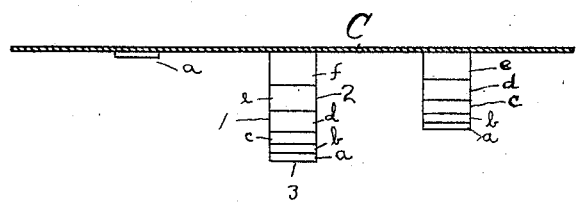

Figure 1 shows a sheet of sensitized pigmented paper according to the new method prior to printing, the paper-support being shown in section and the colored films in edge view. Fig. 2 shows the same during the printing process, the supports being shown in section and the colored films in edge view. Fig. 3 illustrates the first transfer, the paper-support being shown in section and the colored films in edge view. Fig. 4 illustrates the second transfer, the paper-support being shown in section and the colored films in edge view.

A is a sheet of sensitized paper provided with colored films according to my invention before printing. The films *a b c d e f g* are here assumed to be of the following colors consecutively: blue, pink, yellow, red, green, black, with a bottom protecting-film of red. In printing, the rays of light penetrate from above—that is to say, from the film side—through the negative to the paper, and those rays which pass through parts of the negative caused, for instance, by green foliage penetrate, as the drawings show, as far as the green film *e*. Those rays which pass through the wholly-transparent parts of the negative and which represent deep shades penetrate to the black film *f*, and those rays which enter through the well-covered parts and which represent the sky penetrate only as far as the (counting from the negative) uppermost film *a*—that is to say, the blue film. The films are shown as graduated in sequence according to their degree of transparency. If now such a printed sheet is transferred to a "transfer-paper" B as ordinarily employed in the autotype process and the original paper A, covering the films, then removed in warm water, together with the red protecting-film *g*, Fig. 2, the water will wash away all those parts which have not been acted upon by light. On the transfer-paper, therefore, there will be, for example, a blue part, a black part, and a green part visible, as shown in Fig. 3. Blue is seen because there is nothing else on the paper than the blue film. Where black is seen, the following films have remained on the paper—viz., the very thin or light-blue film *a*, the likewise thin pinkish-gray interposed or dividing film *b*, the slightly-thicker or more pronounced yellow film *c*, the red film *d*, the green film *e*, and on the top the very thick or dark portion of the black film *f*, which by reason of its depth of color covers all the underlying colors and renders them invisible. Where green is to be seen, there will lie under a thick green film *e* a thinner red film *d*, the yellow film *c*, the pinkish-gray interposed film *b*, and the blue film *a*, all of which last-named films are rendered invisible by the depth of color or strength of the green film. (See Fig. 3.) The result of the graduation of the films (indicated in the case of single transfer) is that the lower-lying films are not discernible. After the single transfer the films, it will be observed, starting from the transfer-paper, increase progressively in covering power, so that the upper film always preponderates over the underlying one or all the underlying ones, whereby these lower films are prevented from appearing. If now such films are transferred a second time onto paper C, Fig. 4, as is usual in autotype printing, in order that the image may not be reversed, it is a natural requirement that the colors after this second transfer shall not be other than before. In other words, it is essential that other colors shall not appear when the colored image is viewed from that side which after single transfer was turned toward the transfer-paper—that is to say, when the colored films are no longer seen from above, but, as it were, from below, as in Fig. 4. This requirement is met by means of the present process, as the following consideration shows. On double transfer the colors in question which now lie lowermost must have a greater strength of color than the "false" colors above them, and this is only possible if they sufficiently preponderate relatively to the superposed films.

The method of operation is illustrated by Fig. 4. Blue appears naturally, since even after the double transfer of the picture there is no other color above it. The parts which are to appear black are formed by, as it were, a column, consisting of a thin film of blue color $a$, a slightly-thicker pink-gray interposed film $b$, a yellow film $c$, a slightly-deeper red film $d$, a deeper-green film $e$, and by a still deeper black film $f$. This black film appears despite the superposition of the other colors, since it is deeper than any other individual color, and, furthermore, a part of the superposed films tends, as it were, to accentuate the effect of the black film with the aid of the interposed films—as, for instance, the red film in conjunction with a large portion of the green film. Where green is to appear, there lies above a very deep-green film a thinner red film, a still thinner yellow, an intermediate film, and an extremely thin blue film. In this case also this lowermost green film by reason of its depth of color is to be seen through all the superposed films, apart from the fact that here likewise a portion of the other films—viz., the blue and the yellow—combine to accentuate the effect of the green. In the pigmented paper ready for printing predominance of black can be recognized by the paper appearing black, despite the superposed colored films $a$ to $e$, Fig. 1. The graduation of the films relatively to each other does not relate to their purely physical dimensions, but rather to their covering power.

The oblique lines 3 extending between the lines 1 2 running in a vertical direction, which represent the rays of light, are to indicate that said rays of light do not all penetrate to a uniform depth even within the same layer. However, during the developing process this difference is equalized, and therefore the lines 3 of those layers which have been left after development are drawn straight in Figs. 3 and 4.

Having thus described my invention, I claim as new—

A pigmented paper suitable for double transfer, presenting a plurality of superposed films of divers colors, increasing in covering power in the direction toward the paper layer, substantially as described.

In testimony whereof I have signed my name to this specification in the presence of two subscribing witnesses.

ADOLF HESEKIEL.

Witnesses:
 WOLDEMAR HAUPT,
 HENRY HASPER.